United States Patent Office 2,897,050
Patented July 28, 1959

2,897,050

SEPARATION OF RARE EARTH VALUES BY MEANS OF A CATION EXCHANGE RESIN

Sigmund Jaffe, Plainfield, N.J., assignor to Air Reduction Company, Incorporated, New York, N.Y., a corporation of New York No Drawing. Application April 28, 1954
Serial No. 426,277

4 Claims. (Cl. 23—22)

This invention relates to the ion exchange separation of rare earth elements.

The term "rare earths" is used to designate the group of elements between lanthanum, atomic number 57, and lutecium, atomic number 71, inclusive. To these elements should be added ytrrium, atomic number 39, and scandium, atomic number 21, which are nearly identical with the rare earths in properties and usually occur together with them in natural deposits.

Since the rare earths are intimately mixed together in the natural states and have very similar chemical and physical properties, differing each from the other only very slightly, they cannot be easily separated. A number of processes have been suggested for separating the rare earth elements. These include: fractional crystallization or precipitation, solvent extraction, and ion exchange. All of these methods are tedious and difficult to control.

Of these separation processes, the ion exchange method has been shown to be particularly advantageous in obtaining relatively pure materials. The separation of rare earths by ion exchange technique reflects the difference in basicities and complex stabilities of the rare earths. The rare earth tripositive ions are adsorbed on an ion exchange resin by virtue of the fact that they can displace other ions from the resin. When such resin is treated with a solution containing mixed rare earths, the latter displace the hydrogen ions on the resin and are thus bound to it. Treatment of this rare earth-containing resin with a solution containing a complexing agent results in an equilibrium between rare earths bonded to the resin and rare earths eluted into solution by the complex anion. This equilibrium is dependent on the relative strengths of the bonds of individual rare earths to the resin and the strength of the complex forming characteristics of individual rare earths. This results in a partition of the individual elements varying with both strength of resin bond and complex anion. When this process takes place in a column type operation, the individual rare earths are distributed as fractions. With careful control, individual rare earths may be obtained with very high degrees of purity. A further description of ion exchange separation of rare earths may be found in United States Patent No. 2,539,282, issued to Frank H. Spedding and Adolf F. Voigt on January 23, 1951.

Previous ion exchange separations required laborious and numerous chemical and graphical analyses in order to follow the elution of fractions from ion exchange columns. Successive portions of the eluate had to be collected and separately analyzed, and the results plotted graphically in order to select the proper eluate fraction enriched in a desired rare earth element. See, for example, United States Patent No. 2,546,953 issued to Kenneth Street, Jr., on March 27, 1951, and the patent to Spedding et al., referred to above.

Accordingly, it is an object of this invention to provide a process for the ion exchange separation of rare earths which obviates the necessity for chemical and graphical analyses of eluate portions.

Another object of this invention is to provide an improved ion exchange resin.

A still further object of this invention is to facilitate the control of production variables in ion exchange separations.

Other objects will in part appear in and in part will be obvious from the following detailed description.

In accordance with this invention, it has been found that oxidation of the ion exchange resin will remove the dark decomposition products which normally discolor the resin. And, if such an oxidized and purified ion exchange resin is employed for the ion exchange separation of rare earth elements, the various rare earth ions can be readily observed to separate into distinct colored bands. Furthermore, it has been found that the colors of the rare earth bands are characteristic of the particular rare earth ion. In addition, by observing the shape, position, and hue of the rare earth bands appearing on the ion exchange column, the eluting conditions may be regulated to obtain the most efficient separations without resorting to laborious chemical and graphical analyses. The rare earths may be eluted off the column using color alone as a guide for proper fractionation. Not only does this novel color technique serve as an aid in controlling the conditions of the separation, but also this procedure may be utilized analytically. Rare earth mixtures may be analyzed by their relative positions, band sizes, and colors on an ion exchange column. Under a given set of eluting conditions, the band widths are proportional to the amount of an element present and the colors serve to identify the element.

Of the ion exchange resins employed in the separation of rare earth elements, the cationic type represented by the sulfonated polyvinyl aryl resins have been found most suitable. The sulfonated polystyrene divinyl benzenes, sold under the trade-names Dowex-50, Nalcite High Capacity, or Amberlite IR 120, have been found particularly useful. Due to the decomposition products present in these resins, they are commercially available only as a dark brown material. It has been found that if these resins are subjected to the action of an oxidizing agent under controlled conditions, a light-colored material can be obtained. As previously pointed out above, many advantages are to be obtained from the use of the light-colored resin. Rare earth and other colored ions can be seen clearly on the ion exchange columns. This allows one to immediately observe the results of varying conditions on the column without laborious chemical and graphical analyses. For example, if the pH of the elutriant is too high, a precipitate of hydroxides can be seen and corrective measures can be taken to lower the pH. On the other hand, if the pH of the elutriant is too low, there will not be an effective separation and the distinct colored bands, each band representing a different rare earth element, will not form or will only take on an indistinct appearance. Immediate corrective action can be taken to raise the pH, under these conditions. Thus, the color can be used as an index for both experimental and production control.

Another advantage of seeing the colors is that the characteristic colors and positions of the rare earth bands serve as a means of identification of the amounts and kinds of elements present. Set forth below is a table which lists the order of elution and the color of the band of each of the rare earth elements as it appears on the column. The order of elution is given so that the first on the list is the first down the column or the lowest band as it appears on the column. The colors are all pastel in nature, and it will be realized that the colors may appear slightly different to other observers.

Order of elution:                    Color
    Scandium _____ Colorless.
    Lutecium _____ Colorless.
    Thulium _____ Pale green.
    Erbium _____ Bright pink.
    Holmium _____ Light pink.
    Dysprosium _____ Light green.
    Yttrium _____ Colorless.
    Terbium _____ _____
    Gadolinium _____ Colorless.
    Europium _____ Colorless.
    Samarium _____ Pale yellow.
    Neodymium _____ Violet.
    Praesodymium _____ Green.
    Cerium _____ Colorless.
    Lanthanum _____ Colorless.

While some of these rare earth elements are apparently colorless, a line of demarcation can usually be noticed separating even these "colorless" rare earth bands.

In carrying out the oxidation of the ion exchange resin in accordance with this invention, high temperatures and violent oxidation must be avoided to prevent decomposition and/or charring of the resin. Since the resin normally decomposes at 150° C., temperatures below 100° C. should be employed, and it is preferable to operate at temperatures between 40° C.–80° C. Any oxidizing agent which is mild enough to oxidize the resin and not so strong that it chars the resin or leaves it off-color may be employed. Ozone and commercially available solutions of hydrogen peroxide have been found particularly effective. Of these two, hydrogen peroxide is much more practical for commercial operation. On the other hand, sodium hypochlorite turned the resin an orange-yellow and, therefore, was objectionable.

The oxidation may be carried out by preparing an aqueous slurry of the ion exchange resin, adding the oxidizing agent to the slurry, warming the mixture to the reaction temperature, and then permitting the reaction to proceed for the necessary time to react with and thus eliminate the colored impurities from the ion exchange resin. After the reaction is completed, i.e., a light cream-colored resin has been formed, the resin is washed with water to remove any remaining oxidizing agent, and the excess water containing fine particles of resin are decanted. The resin is kept wet for use and is loaded into the column in the wet condition to prevent swelling or expansion of the resin when the eluting agent is added and the possible cracking of the ion exchange column.

The ion exchange resin should preferably be of a particle size between 100–200 mesh. This particle size has been found particularly effective since it is fine enough to expose a large surface area for chemical reaction and proper adsorption, and is not so fine as to solidly pack the column and retard the flow of the solutions through the column.

The elutriant or eluting agent should be capable of forming water-soluble complexes with the rare earth ions and thereby being able to remove the adsorbed ion from the ion exchange resin. Such eluting agents may be: the water-soluble salts of ethylenediaminetetraacetic acid (sometimes referred to as Versene or Sequestrene), e.g. its sodium or ammonium salts, citric acid, ammonium citrate, lactic acid or ammonium lactate. Ammonium citrate and the ammonium salt of ethylenediaminetetraacetic acid have been found to be particularly effective. If citric acid or ammonium citrate is employed, a pH of 6.0–8.0 should preferably be used to accomplish the most effective separation of rare earth elements. If the ammonium salt of ethylenediaminetetraacetic acid is employed as the eluting agent, the pH should preferably be maintained between 8.0 and 8.5.

A pH of 6.0 is preferred with a fine particle size resin, i.e., a major portion of the resin particles below 100 mesh; and a pH of 8.0 being preferred for large particle size resin, i.e., a major portion of the resin particles between 20–50 mesh. Use of a lanthanum citrate-lanthanum chloride mixture as the eluting agent permitted an increase in chemical flow rate by a factor of three without impairing the effectiveness of the separation. The lanthanum citrate mixture was prepared by dissolving $La_2O_3$ in hydrochloric acid and evaporating this solution to dryness, after which the neutral $LaCl_3$ formed was dissolved in 0.1% citric acid solution. The pH of this solution was increased to about 6.0 by the addition of excess $La_2O_3$.

In carrying out the separation according to a preferred form of the present invention, the oxidized purified light-colored resin while wet is loaded into the columns to a suitable height. The column may consist of a thick-walled glass tube which has facilities for feeding in solutions on the top and for backwashing from the bottom. A Monel screen or porous porcelain plate can serve as a retainer for the resin bed. Provision is preferably made for several outlets on the bottom of the column so that channeling (to a single, narrow outlet) is prevented. Suitable mixing tanks, pumps, pipelines, valves, head tanks, etc. should be provided to complete the eluting operation. Stainless steel acid resistant plastic, or glass or ceramic lined tanks are suitable for storage and head tanks.

The resin is backwashed, that is, water is passed through the bottom of the column and out the top causing the lighter, smaller particles to be washed out. Then the resin is allowed to settle. This procedure yields a well-packed, uniform resin bed.

The rare earth mixture or concentrate is converted to a soluble salt such as the chloride or nitrate, and loaded in the column at a pH of about 2–3. The total load depends upon the size of the column and length of the bed. About a pound of rare earth, as oxide, can be loaded on a six-inch diameter column containing approximately 40 pounds of resin. The rare earth adsorbs on the resin in a band at the top of the column. The resin is again washed with water to remove any hydrochloric or nitric acid displaced in adsorbing the rare earth soluble salt.

The column is eluted with an eluting or complexing agent. In a preferred embodiment, an 0.1% solution of citric acid, the pH of which has been raised to about 6–8 by the addition of $NH_4OH$, is used. In addition, phenol or other mold retarding agent, may be used to the extent of about 0.1%, in order to prevent the formation of mold in the resin. The linear flow rate is adjusted to about 0.5–0.7 cm./minute.

Distinct colored layers or bands appear on the column, each colored layer representing a particular rare earth element. Successive portions of the eluate, each enriched in a particular rare earth element, can be collected by merely observing the colored layers as they pass down through the column. That is, an eluate portion is collected from the start of one colored band to the start of the next succeeding colored band. This portion would be enriched in a particular rare earth element, the identity of which can be determined by its position in the column and its color in accordance with the chart given above. The relative width and the color intensity of the band would indicate the relative amounts of the rare earth element present.

To obtain materials of higher purity, the rich fractions or the overlapping areas between fractions may be readsorbed in additional columns.

When the desired separation is attained, the rare earths are precipitated as rare earth oxalates and ignited at a temperature which may vary from 800° C. to 1000° C., and which is preferably about 950° C., to obtain rare earth oxides.

The columns are stripped of any residual rare earths by passing a solution of about 5% citric acid through them. This leaves the column in the ammonium cycle. The column can be used again in this form or the resin may be regenerated in the acid cycle to start the operation over again.

The rate of linear flow of the elutriant solution moving down the column would depend upon the particle size of the resin and the nature or composition of the rare earth load. The linear rate for most effective separation may vary from 0.5 to 0.75 cm./minute. Normally the slower the rate of flow, the more effective the separation; but practical considerations as to the time of the operation must be taken into account.

It has also been found that it is particularly advantageous to load the rare earth mixtures on the ion exchange column in the following manner. The strong salt of the rare earth mixture, e.g., rare earth chloride mixture, is poured rapidly onto the resin bed in the column. This action may disturb the bed. However, after the rare earths are adsorbed, a stirrer is inserted into the column to a depth equal to the deepest penetration of the rare earth ions. The stirrer is fitted into the column so that it sweeps out an even horizontal cylinder of resin. The resin is thoroughly mixed and then allowed to settle before elution proceeds. This procedure yields very regular, horizontal rare earth bands in the subsequent elution of the mixture.

In order that those skilled in the art may better understand how the present invention is carried into effect, the following illustrative examples are given. Examples 1 and 2 illustrate the purification or oxidation of the ion exchange resin, and Example 3 is a typical separation possible with the use of the light cream-colored resin obtained after oxidation.

*Example 1*

Ten (10) pounds of dark brown Dowex–50–X–12–colloidal agglomerate, a sulfonated polystyrene cation exchange resin, is added to a 5-gallon carboy. An aqueous slurry of the resin is formed by adding sufficient water. 200 ml. of a 30 percent aqueous solution of $H_2O_2$ is then added to the slurry. The slurry mixture is then warmed to about 50° C. by steam injection. The mixture is stirred and allowed to stand for about 12 hours. After the reaction is completed and the impurities in the resin have been decomposed, the resin is washed with water, and the excess water containing some fine resin particles are decanted. The resin obtained is a light-cream color and can be used directly to pack the ion exchange columns.

*Example 2*

Fifty (50) grams of dark brown Dowex–50–12–colloidal agglomerate, a sulfonated polystyrene cation exchange resin, which has been previously screened to ensure a particle size of from 50–200 mesh size, is slurried in 200 ml. of water. Ozone, from a standard ozonizer, is bubbled through the slurry for about four hours. The excess water is decanted. The resin obtained is a light-cream color.

*Example 3*

Fifteen (15) grams of a monazite concentrate, comprising a mixture of various rare earth oxides, is dissolved in concentrated HCl. (About 1.5 ml. of concentrated HCl is needed per gram of oxide.) The resulting solution is evaporated to near dryness, and then dissolved in 100 ml. of water.

The aqueous rare earth chloride solution is poured into the ion exchange column. The column comprises a 2-inch diameter Pyrex glass tube 4 feet high, which is loaded to a depth of about 2½ feet with cation exchange resin, which has been treated in accordance with Example 1, supra. A sintered glass plate at the bottom of the column is used to retain the resin bed. Distilled water is passed down the column until the rare earth ions are completely adsorbed on the resin. Completion of the adsorption is detected by the resin becoming pale violet in color, and the band front not proceeding downward any longer.

A 0.1% solution of citric acid at a pH of 6.0, the pH regulated by the addition of ammonium hydroxide, is introduced into the top of the column. The downward flow is at a rate of 12–15 ml./minute. The various rare earth ions separate in the column according to their ease of complex formation and strength of their adsorption on the resin.

The rare earth ions from scandium through gadolinium preceded the others and separated out into an amber band. Distinct bands corresponding to particular rare earth ions appear in the column. Reading the column from the bottom to the top, they are: samarium—pale yellow, neodymium—violet, praesodymium—green, cerium—colorless, and lanthanum—colorless. Although cerium and lanthanum bands are each colorless, there is still a noticeable boundary line separating these two rare earth ions.

The bands progress down through the column on continued elution with citric acid. When they approach the bottom, successive portions are collected by following the movement of the band and collecting the eluate corresponding to each of the bands. There is some overlapping area between some of the bands, said overlap containing rare earth ions from the next preceding and succeeding bands. These overlap areas may be separately collected and recirculated through another ion exchange column for further purification and separation.

Each of the collected portions are precipitated as the oxalate by the addition of oxalic acid, and then ignited in a muffle furnace at 950° C. for 6 hours to obtain rare earth oxides. The oxides are then weighed.

Recovery: La=2.76 g.; overlap La+Ce=0.71 g.; Ce=6.57 g.; overlap Ce and Pr=0.45 g.; Pr=0.81 g.; overlap Pr+Nd=0.34 g.; Nd=2.48 g.; overlap Nd+Sm =0.33 g.; Sm+Gd=0.32 g.; other rare earths containing rare earths from the yttrium group (Tb through Sc) =0.21 g.

While the use of the light-colored cationic exchange resin prepared by mild oxidation has been demonstrated as particularly useful in the separation of rare earths, it will be readily understood by those skilled in the art that the present invention can be utilized in other ion exchange separations. The invention should not be limited except as defined in the claims.

What is claimed is:

1. In the method of separating rare earths by absorbing an aqueous solution of water soluble inorganic salts of said rare earths on a column of a sulfonated polystyrene cation exchange resin and passing an eluting agent through said column to cause said solution to separate into bands of individual rare earth salts the improvement which comprises first reacting said resin with an oxidizing agent to mildly oxidize said resin and decompose impurities therein to produce a uniformly light colored cation exchange resin column and after said rare earth solution is added to said column thoroughly mixing that portion of said resin column in which said rare earth solution is absorbed to provide a homogeneous bed of uniform depth whereby passage of said eluting agent through said column causes said rare earth salts to separate into sharply defined, visibly distinct, regular, horizontal colored bands which may be readily separated from one another.

2. A method for the separation of rare earths which comprises reacting a sulfonated polystyrene cation exchange resin with an oxidizing agent selected from the group consisting of hydrogen peroxide and ozone at a temperature below 100° C. without charring said resin to produce a purified mildly oxidized resin substantially free from dark colored impurities, adsorbing an aqueous solution of water soluble inorganic salts of rare earths on a uniformly light colored column of said purified resin, stirring that portion of said resin column containing rare earth adsorbed resin to form therefrom a uniform bed at the top of the column, passing an eluting agent through said column thereby separating the various rare earths into visibly distinct, regular, horizontal colored bands, and collecting successive portions of eluate corresponding to said distinct colored bands.

3. A method for the separation of rare earths which comprises reacting a sulfonated polystyrene cation exchange resin with an oxidizing agent selected from the group consisting of hydrogen peroxide and ozone at a temperature below 100° C. without charring said resin to produce a purified, mildly oxidized resin substantially free from dark colored impurities, absorbing an aqueous solution of water soluble inorganic salts of rare earths selected from the group consisting of rare earth chlorides and nitrates on a uniformly light colored column of said purified, sulfonated polystyrene cation exchange resin wherein the amount of said resin is approximately in the ratio of forty pounds of resin to one pound of rare earth, stirring that portion of said resin column containing rare earth absorbed resin to form therefrom a uniform bed at the top of the column, passing an eluting agent selected from the group consisting of citric acid, ammonium citrate, the ammonium salt of ethylenediaminetetraacetic acid, lactic acid, ammonium lactate, and lanthanum citrate having a pH of from 6–8 through said resin column at a flow rate of from 0.5 to 0.75 cm./minute thereby separating the various rare earths into visibly distinct, regular, horizontal colored bands, and collecting successive portions of eluate corresponding to said distinct colored bands.

4. A method for the separation of rare earths as defined in claim 2, wherein the eluting agent comprises the ammonium salt of ethylenediaminetetraacetic acid.

References Cited in the file of this patent
UNITED STATES PATENTS

| | | |
|---|---|---|
| 1,976,293 | Prandtl | Oct. 9, 1934 |
| 2,327,992 | Blumenfeld | Aug. 31, 1943 |
| 2,366,007 | D'Alelia | Dec. 26, 1944 |
| 2,451,272 | Blann | Oct. 12, 1948 |
| 2,522,569 | Day et al. | Sept. 19, 1950 |
| 2,539,282 | Spedding et al. | Jan. 23, 1951 |
| 2,541,909 | Bailey et al. | Feb. 13, 1951 |
| 2,676,923 | Young | Apr. 27, 1954 |
| 2,730,486 | Coonradt et al. | Jan. 10, 1956 |

OTHER REFERENCES

Spedding et al.: J.A.C.S., vol. 72, June 1950, p. 2354.

Spedding et al.: "Journal of the American Chemical Society," vol. 76, No. 9, pages 2545–2550, received Aug. 17, 1953.

Bendall et al.: "Nature," Sept. 13, 1947, vol. 160, page 374.

Vickery: "Chemical Society Journal," 1952, part 4, P.R. 4357–4363.

Samuelson: "Ion Exchangers in Analytical Chemistry," pub. by John Wiley and Sons, N.Y., 1953, pp. 76, 104, 173 and 174.

Kunin et al.: "Ion Exchange Resins," pub. by John Wiley and Sons, N.Y., 1950, pages 67, 68, 118, 119, 139 and 140.